US005632666A

United States Patent [19]
Peratello et al.

[11] Patent Number: 5,632,666
[45] Date of Patent: May 27, 1997

[54] METHOD AND APPARATUS FOR AUTOMATED QUALITY CONTROL IN WAFER SLICING

[75] Inventors: Andrea Peratello, Barengo; Fabrizio Leoni, Novara, both of Italy

[73] Assignee: MEMC Electronic Materials, Inc., St. Peters, Mo.

[21] Appl. No.: 330,906

[22] Filed: Oct. 28, 1994

[51] Int. Cl.$^6$ ............................................. B24B 53/07
[52] U.S. Cl. ............................... 451/5; 451/10; 451/11; 451/56; 451/443; 125/13.02; 125/11.04; 125/11.18
[58] Field of Search ........................... 451/5, 10, 11, 451/21, 22, 56, 443, 419, 69; 125/13.02, 11.04, 11.12, 11.18

[56] References Cited

U.S. PATENT DOCUMENTS

| | | | |
|---|---|---|---|
| 4,498,345 | 2/1985 | Dyer et al. | 73/849 |
| 4,971,021 | 11/1990 | Kubotera et al. | 125/13.02 |
| 5,144,938 | 9/1992 | Seeburger et al. | 125/13.02 |
| 5,287,843 | 2/1994 | Katayama et al. | 125/13.02 |
| 5,383,444 | 1/1995 | Kimura | 125/13.02 |
| 5,413,521 | 5/1995 | Terashima et al. | 451/1 |
| 5,458,526 | 10/1995 | Tsukapa et al. | 125/13.02 |

FOREIGN PATENT DOCUMENTS

| | | |
|---|---|---|
| 313714 | 5/1989 | European Pat. Off. . |
| 456223 | 11/1991 | European Pat. Off. . |

OTHER PUBLICATIONS

Mitsubishi Metal Corporation, "Guidance in the Usage of ID Blades", pp. 7, 8, 11–14 and 21, date unknown.

Toyo Advanced Technologies Co., Ltd., "CNC Slicing Machine" brochure, 4 pages, date unknown.

Toyo Advanced Technologies Co., Ltd., "Development of Fully–Automatic Slicing Machine", 9 pages, published prior to Oct. 28, 1993.

Mitsubishi Metal Corporation, MTD–0S (Mitsubishi Tracking Dressing Operation System)—Operation Guide, published prior to Oct. 28, 1993.

Meyer–Burger AG, "Meyer–Burger—A Step Ahead" brochure, 16 pages, date unknown.

*Primary Examiner*—Bruce M. Kisliuk
*Assistant Examiner*—Eileen P. Morgan
*Attorney, Agent, or Firm*—Senniger, Powers, Leavitt & Roedel

[57] ABSTRACT

An internal diameter saw, and in particular a method for operation which facilitates the maintenance of quality control of semiconductor wafers sliced from an ingot of source material. The internal diameter saw has a controller which monitors the deflection of the cutting edge of the blade at a location within the ingot as a wafer is sliced. Depending upon the deflection of the blade which is detected within the crystal, a blade dressing device is automatically activated to sharpen the blade following the cut.

18 Claims, 3 Drawing Sheets

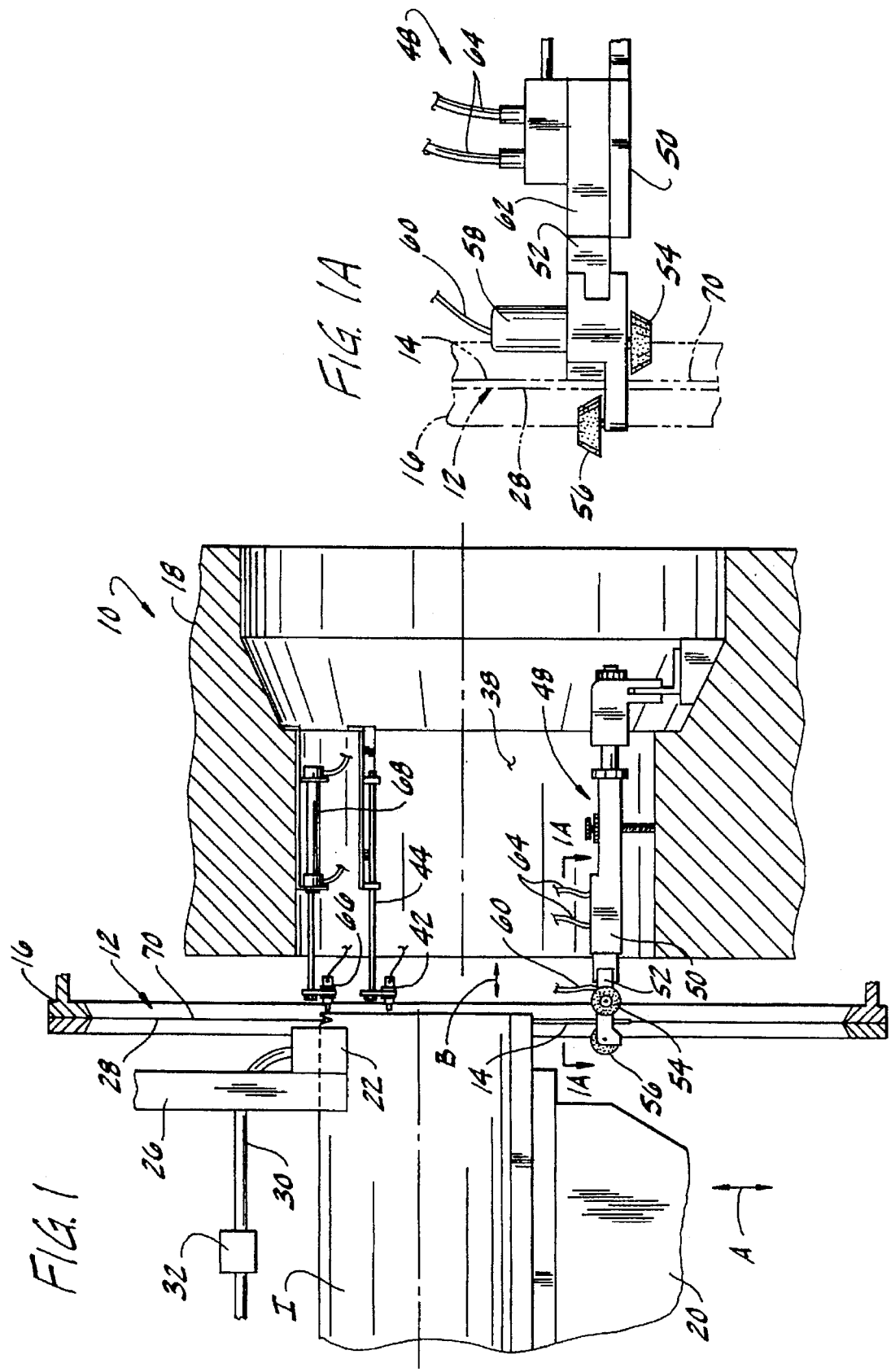

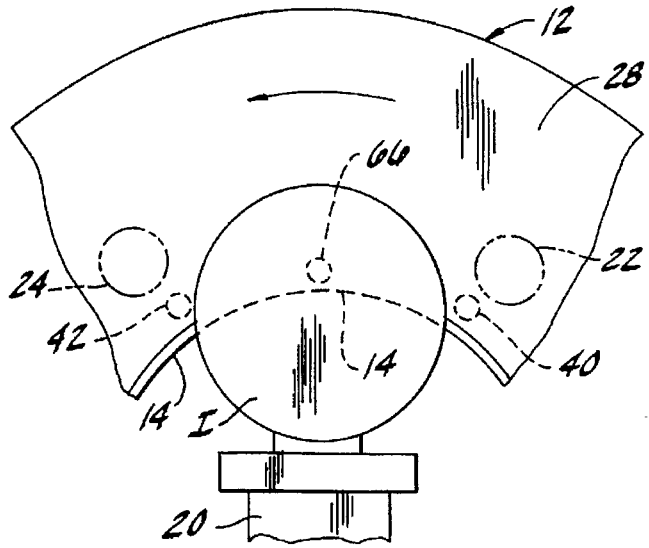
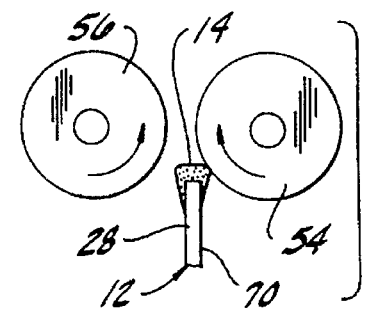
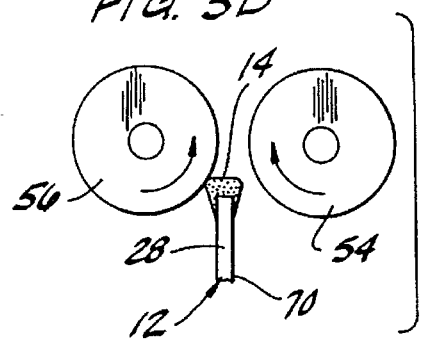
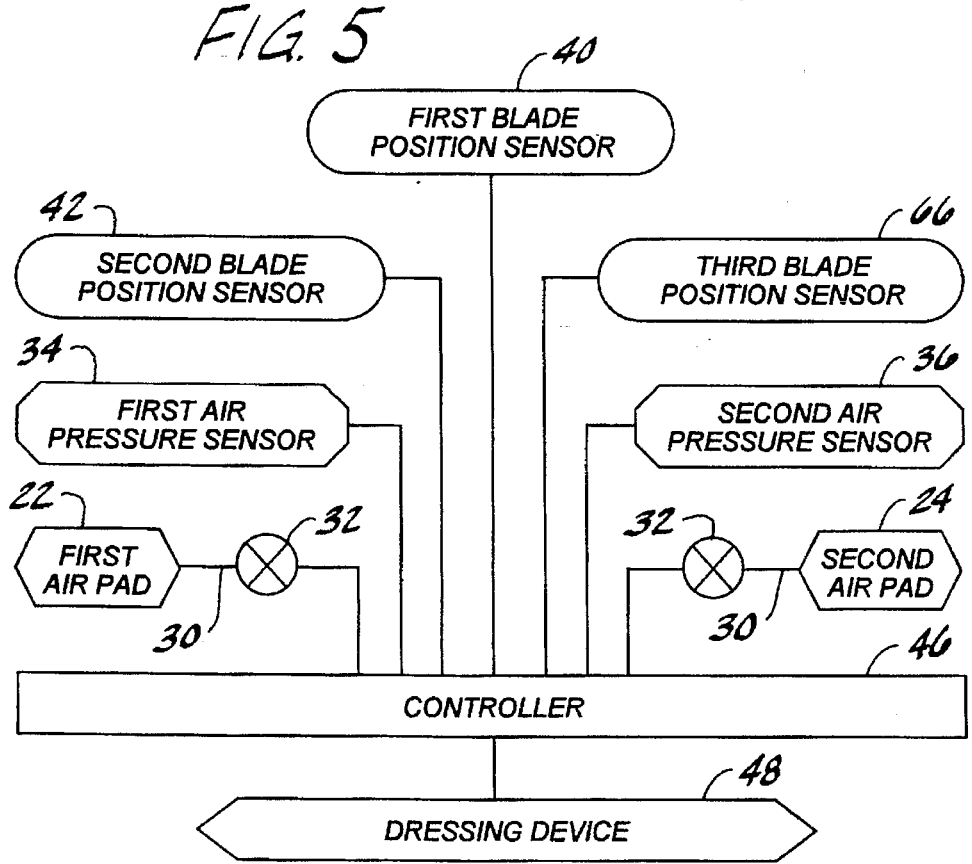

METHOD AND APPARATUS FOR AUTOMATED QUALITY CONTROL IN WAFER SLICING

BACKGROUND OF THE INVENTION

This invention relates generally to wafer slicing and more particularly to quality control in wafer slicing.

Internal diameter saws having an annular saw blade with a diamond-coated cutting edge on its inner diameter are conventionally used to slice thin wafers from an ingot of monocrystalline semiconductor material. The wafers are sliced by either advancing the ingot against the blade or advancing the blade against the ingot. The axis of rotation of the blade may be either horizontal or vertical.

Cutting resistance forces during slicing cause the blade to deflect transversely to the cutting direction and out of the plane of the blade. If sufficiently large, this deflection can produce undesired warpage, saw marks and thickness variations in the wafers sliced. The warpage cannot be eliminated by operations subsequent to slicing such as lapping. Even though saw marks and thickness variation can be eliminated by increasing stock removal in processing operations after slicing, the resultant material loss and time inefficiencies make this solution highly undesirable.

The cutting resistance encountered by the blade is primarily a function of the condition of the diamond-coated cutting edge of the blade. In order to limit the cutting resistance forces and concomitant blade deflection, it is standard industry practice to dress the cutting edge of the blade using special dressing stones. The dressing stone is pushed in a specific direction and with a particular pressure against the cutting edge of the blade according to the measured warpage of wafers sliced by the saw. The dressing operation is critical to controlling the quality of the wafers sliced, but in practice is highly dependent upon the subjective judgment of the saw operator and does not always result in the desired correction on the cut following the dressing operation.

Various equipment and methods have been employed for controlling the quality of sliced wafers. European patent application No. 88101301.5 describes an apparatus and method for slicing a wafer in which, after a wafer is sliced, the end face of the ingot is ground. The disclosed apparatus and method reduce warpage, but do not reduce saw marks or thickness variation because the apparatus and method do not even attempt to reduce blade deflection. European patent application No. 91107503.4 describes a method in which the annular blade of an internal diameter saw along its cutting edge is intentionally deflected prior to slicing through application of a force perpendicular to the blade surface near the cutting edge. More specifically, the application discloses air jet nozzles located with respect to the annular saw blade for directing a jet of air against the blade surface at positions where the blade enters the ingot, and where it exits the ingot, respectively. Blade position sensors are located for detecting blade position at the same two locations. A control unit is capable of adjusting the pressure applied to the blade surface through each nozzle in response to the detected blade deflection. This system is able to minimize blade deflection at the locations where the air jets impinge the blade, but does not prevent blade deflection within the ingot of sufficient magnitude to reduce warpage, thickness variations and saw marks.

SUMMARY OF THE INVENTION

Among the several objects and features of the present invention may be noted the provision of a method for automated quality control in wafer slicing in which warpage, saw marks and thickness variation in wafers sliced from an ingot are minimized; the provision of such a method which consistently reduces deflection of the portion of the saw blade within the ingot; the provision of such a method which automatically initiates blade dressing based on measured deflection of the blade within the ingot; and the provision of such a method which increases the rate of production of wafers while permitting a higher quality of wafer to be produced.

Further among the several objects and features of the present invention may be noted the provision of apparatus for slicing wafers from an ingot of wafer source material which achieves the advantages set forth above; the provision of such apparatus which automatically dresses the cutting edge of the blade in response to detected blade deflection; and the provision of the apparatus which adjusts to maintain quality without substantially interrupting wafer slicing.

Other objects and features of the present invention will be in part apparent and in part pointed out hereinafter.

BRIEF DESCRIPTION OF THE DRAWINGS

FIG. 1 is a schematic, fragmentary side view an internal diameter saw having an annular blade for slicing wafers from an ingot, a body portion of the apparatus being shown in section to reveal internally mounted blade position sensors and a blade dressing device;

FIG. 1A is a fragmentary plan view of the dressing device as seen from the vantage indicated by line 1A—1A of FIG. 1 and showing the annular blade in phantom;

FIG. 2 is a schematic end view of the apparatus illustrating the location of the sensors and air jet pads relative to the blade and ingot;

FIGS. 3A and 3B are schematic views illustrating operation of the blade dressing device;

FIG. 5 is a schematic view of the controller showing its connection to various blade deflection control features of the apparatus.

Corresponding reference characters indicated corresponding parts throughout the several views of the drawings.

DETAILED DESCRIPTION OF THE PREFERRED EMBODIMENT

Figure 4:
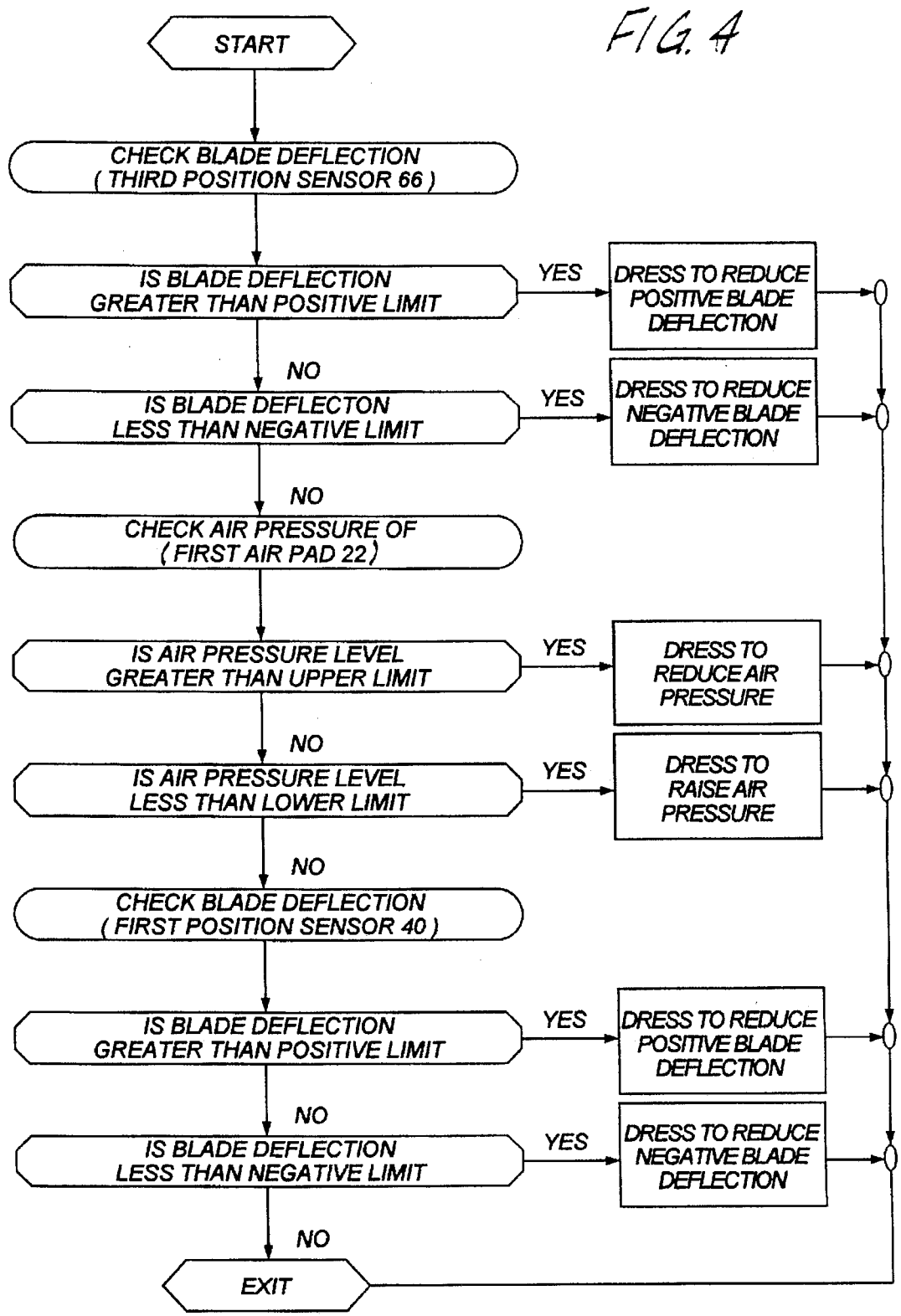
FIG. 4 is a flow chart illustrating operation of a controller for dressing the blade in response to detected conditions.

Referring now to the drawings, and in particular to FIG. 1, apparatus for slicing wafers from an ingot I of wafer source material (e.g., a monocrystalline silicon ingot) is shown to comprise an internal diameter saw, generally indicated at 10. The internal diameter saw 10 has an annular blade, generally indicated at 12, with a diamond coated cutting edge 14 on its internal diameter. The annular blade 12 is held by a ring 16 mounted for powered rotation on the saw's body (designated in its entirety by reference numeral 18) in a conventional fashion. The ring 16 holds the blade 12 in tension to aid it in resisting deflection of the blade out of its plane. The ingot I is held on a support 20 of the saw 10 with an end portion projecting out from the support through a central opening of the annular blade 12. The support 20 is capable of moving the ingot I in directions (indicated by arrows A in FIG. 1) transverse to the longitudinal axis of the saw 10 to bring the ingot I into engagement with the cutting edge 14 for slicing wafers from the ingot. However, whether it is the ingot I which moves into engagement with the blade 12 or the blade which moves into engagement with the ingot is immaterial so far as the present invention is concerned.

First and second air jet nozzles or pads (designated 22 and 24, respectively) are mounted by respective brackets 26 (only one is shown) for directing jets of air against a face 28 of the annular saw blade 12 directed outward from the body 18 of the internal diameter saw 10. Each pad is connected by an air delivery line 30 to a solenoid valve 32 operable to regulate the pressure of air exerted from the pads on the outer face 28. As shown in FIG. 2, the pads 22, 24 are located on either side of the ingot I adjacent to the locations where the annular blade 12 enters and exits the ingot, respectively. In the illustrated embodiment, the first pad 22 directs an air jet onto the portion of the blade 12 adjacent where it enters the ingot I, and the second pad 24 directs its air jet onto a portion of the blade 12 near where it leaves the ingot. First and second pressure sensors (designated 34 and 36, respectively) monitor the pressure exerted by the first and second air pads 22, 24, respectively, onto the outer face 28 of the annular blade 12 (FIG. 5).

Referring to FIGS. 1 and 2, the body 18 of the internal diameter saw 10 has an internal cavity 38 opening outwardly from the body and generally coaxial with the central opening of the annular blade 12. First and second noncontacting blade position sensors (designated 40 and 42, respectively) are mounted on the body 18 in the cavity 38 by respective brackets 44 (only one is shown). In the preferred embodiment, the sensors 40, 42 are eddy current sensors which detect disturbances in a generated magnetic field caused by movement of a portion of the blade 12 near the cutting edge 14 viewed by the sensor. The detected blade positions are in directions perpendicular to the plane of the blade (indicated by arrow B in FIG. 1). Thus, the first and second position sensors 40, 42 detect the deflection out of the plane of the blade 12 of the portions of the blade adjacent its entry into and exit from the ingot I.

As shown in FIG. 5, the first and second position sensors 40, 42, the solenoid valves 32 and first and second pressure sensors 34, 36 are connected to a controller 46 (broadly, "control circuit") which operates the internal diameter saw. The controller 46 (e.g., an industrial PC) is capable of controlling the solenoid valves 32 to regulate the air pressure applied by the pads 22, 24 against the outwardly directed face 28 of the blade 12 as a wafer is being sliced. The controller 46 receives signals from the first and second position sensors 40, 42 indicative of the position of the respective portions of the blade 12 viewed by those sensors relative to a zero blade deflection position. In response, the controller incrementally increases the air pressure applied to the blade face by each air pad (22 or 24) if the detected deflection from the zero blade deflection position toward the air pad exceeds a predetermined limit. The air pressure is incrementally reduced when the deflection away from the air pad (22 or 24) exceeds the predetermined limit. In this way the deflection of the blade 12 as it enters and exits the ingot I is controlled.

A commercially available dressing device, generally indicated at 48, is mounted on the body 18 in the cavity 38 and extends outward from the cavity through the central opening of the annular blade 12. The dressing device 48 includes a base 50 fixedly mounted on the body 18 in the internal diameter saw and an arm 52. An inner dressing wheel 54 and an outer dressing wheel 56 made of a special stone for sharpening the cutting edge 14 of the blade 12 are mounted for rotation on the free end of the arm 52 and disposed on opposite sides of the cutting edge. The rotation of the wheels 54, 56 is driven by an electric motor 58 mounted on the telescoping arm 52 and connected to a source of electrical power by a flexible cord 60. An air cylinder 62 telescopically receiving the arm 52 selectively moves the arm in an axial direction to bring one or the other of the dressing wheels (54 or 56) into engagement with the cutting edge as required. The air cylinder 62 is connected to a source of air pressure (not shown) by lines 64. The operation of the air cylinder 62 and electric motor 58 are controlled by the controller 46.

A third blade position sensor 66 is mounted on the body 18 of the internal diameter saw 10 by an air cylinder 68 capable of moving the sensor axially relative to the body. The axial movement of the third sensor 66 in the illustrated embodiment permits it to be moved out of the way so that wafer sliced from the ingot I may be removed by automated handling equipment (not shown). Although not illustrated in FIG. 5, operation of the cylinder 68 to move the third sensor 66 is also controlled by the controller 46. The third sensor 66 is a non-contact, eddy current detector disposed for detecting the position of a portion of the blade 12 near the cutting edge 14 within the ingot I. The third sensor 66, like the first and second sensors, 40, 42, detects the position of the blade 12 in directions B which are generally perpendicular to the plane of the blade. A signal indicative of the blade position is transmitted by the third sensor 66 to the controller 46 (FIG. 5).

The operation of the controller 46 to maintain quality in the wafers sliced by the internal diameter saw 10 is shown in FIG. 4. A key to reduction of warpage, thickness variation and saw marks is limiting the deflection of the blade 12 occurring within the ingot I. Thus, the controller 46 first checks the deflection of the blade 12 within the ingot I using the signal from the third sensor 66 as a wafer is being sliced from the ingot. The deflection of the blade 12 is determined in the controller 46 by comparing the detected, within-ingot blade position to the zero blade deflection position selected to produce a wafer with substantially constant thickness and substantially flat, parallel opposing faces which are generally perpendicular to the edge surfaces of the wafer. Of course, it is not possible to limit blade deflection to precisely zero. Small scale blade deflections (e.g., less than 10 microns) can be permitted without substantially reducing the quality of the sliced wafer. Comparison of the blade deflection with a stored maximum blade deflection limit in the controller 46 will result in the controller activating the dressing device 48 following the cut to dress the cutting edge 14, if the blade deflection exceeds the limit.

The controller 46 examines not only the magnitude of the blade deflection, but its direction relative to the zero blade deflection position to precisely control the dressing operation. All of the position sensors, including specifically the third sensor 66, are capable to detecting the position of the portion of the blade 12 they are viewing both in a positive direction from the zero blade deflection position (i.e., away from the sensor) and in a negative direction (i.e., toward the sensor). Of course, the selection of "positive" and "negative" directions is arbitrary.

If the blade deflection determined by the controller 46 is in the positive direction and exceeds the maximum blade deflection limit, the controller will activate (following the cut) the air cylinder 62 on the dressing device 48 to extend the arm 52 and bring the axially inner dressing wheel 54 into engagement with the cutting edge 14 along an inner face of the blade 12 (FIG. 3A). As described hereinafter, the activation of the dressing device 48 may be overridden by other program parameters of the controller 46. Sharpening the cutting edge 14 along the inner face 70 reduces the cutting resistance on that side of the cutting edge and will reduce the deflection of the blade 12 in a direction away from the third sensor 66 on the next cut. Similarly, if the blade deflection is in the negative direction (i.e., toward the third sensor 66) and its magnitude exceeds the maximum blade deflection limit, the controller 46 will activate the air cylinder 62 to retract the arms 52 and bring the axially outer dressing wheel 56 into engagement with the cutting edge 14 along the outer face 28 of the blade 12 (FIG. 3B). Sharpening the cutting edge 14 on the outer face 28 will reduce the cutting resistance which tends to deflect the blade 12 axially inward toward the third sensor 66. Thus, in general it may be seen that the dressing device 48 is activated by the controller 46 to sharpen the cutting edge 14 on the face (28 or 70) of the blade which is opposite to the detected direction of deflection of the blade 12.

Even if within-ingot blade deflections fall within the maximum limit and no dressing is indicated by the controller 44 as a result of the readings of the third sensor 66, the controller further examines the reading of the pressure sensor 34 for the air jet from the first air pad 22. The pressure of the air jet from the first pad 22 and the blade position detected by the position sensors 40, 42, 66 are generically "blade location factors", indicative of the actual location of the blade 12, or of the force required to maintain the blade at a given location. The internal diameter saw 10 is preconfigured so that a certain amount of air pressure on its outer face from both pads 22, 24, will urge the blade to maintain its location approximately the zero deflection position. Thus, in the preferred embodiment the air pads 22, 24 constantly apply air pressure against the blade 12. However, the air pressure will be adjusted in response to the deflection of the blade 12 detected by the first and second position sensors 40, 42 as the wafer is being sliced.

Should the air pressure applied by the first air pad 22 needed to hold the blade 12 from deflecting more than an upper deflection limit in the positive direction (i.e., toward the first air pad) exceed a zero deflection force pressure by more than a maximum air pressure force deviation limit, the controller 46 will activate the dressing device 48 after completion of that cut to sharpen the cutting edge along the inner face 70 of the blade. The blade deflection toward the first air pad 22 on the next cut will be less and, thus, reduce the air pressure needed to hold the blade 12 from deflecting in that direction. As the blade 12 deflects in a negative direction (i.e., away from the first air pad), the air pressure applied to the outer face 28 will be automatically reduced. If that air pressure falls below the zero blade deflection force by more than the maximum air pressure force deviation limit, the controller 46 activates the dressing device 48 following that cut to sharpen the cutting edge 14 along the inner face 70 of the blade. This dressing should reduce the blade deflection away from the first air pad 22 on the next cut so that the air pressure from the first air pad needed to maintain the blade 12 near the zero blade deflection position is increased to a level within acceptable parameters.

The controller 46 preferably performs yet a third check on the deflection condition of the blade 12. Using the first position sensor 40, the controller 46 monitors the blade position at approximately the location where the air jet from the first air pad 22 impinges upon the outer face 28 of the blade 12. Should the blade position detected be deflected from the zero blade position in the positive direction by an amount greater than the maximum blade defection limit, the dressing device 48 will be activated after the cut to sharpen the cutting edge 14 along the inner face 70 of the blade 12. If the blade deflects from the zero blade position by more than the maximum limit in the negative direction, the cutting edge 14 is dressed on the outer face 28 of the blade 12.

It is believed that it is not necessary to initiate dressing as a result of pressure conditions detected by the second pressure sensor 36 for the second air pad 24 or blade deflection detected by the second position sensor 42. However, it is envisioned that the blade location factors detected by the second air pressure sensor 36 and second position sensor 42 could be substituted for those of the first air pressure sensor 34 and first position sensor 40 for determining when to activate the dressing device 48. Moreover, use of the readings from both the second pressure sensor 36 and second position sensor 42, in addition to those of the first air pressure sensor 34 and first position sensor 42, to initiate blade dressing could be made without departing from the scope of the present invention.

The controller 46 is preferably programmed with a slice count limit which prevents activation of the dressing device 48 regardless of the detected blade deflection or air pressure until a predetermined number of wafers have been sliced from the ingot. More specifically, the controller 46 has a counter to which one is added each time a wafer is sliced and one of the detected blade location factors exceeded the maximum deviation limit during the slicing. When the counter reaches the predetermined number (e.g., 3 counts) dressing is permitted and the counter is reset to zero. Moreover, the controller 46 is also preferably programmed with maximum operation blade deflection limits. Should the blade deflection detected by one of the sensors exceed the operation limit for that particular sensor location, the saw 10 would be shut down.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A method for slicing wafers from an ingot of wafer source material using an internal diameter saw having an annular blade in which at least one process parameter having a direct relationship to wafer quality is measured and automatic adjustments are made in response to the measured process parameter, the method comprising the steps of:

slicing a wafer from the ingot with the internal diameter saw;

detecting during the step of slicing at at least one location a blade location factor including at least one of the position of the blade within the ingot in directions generally perpendicular to the plane of the blade and the force applied to the blade for urging the blade to maintain a zero blade deflection position;

generating at least one signal corresponding to the detected blade location factor;

transmitting the detected blade location factor signal to a control circuit;

determining in the control circuit the deviation of the detected blade location factor from a zero blade deviation factor stored in the control circuit;

comparing in the control circuit the determined blade deviation to a maximum blade deviation limit stored in the control circuit; and activating by operation of the control circuit a blade dressing device to sharpen the blade if the determined deviation of the blade location factor exceeds the stored maximum blade deviation limit;

counting within the control circuit the number of wafers sliced during which the determined blade deflection exceeded the maximum blade deflection limit since the last blade dressing; and prohibiting activation of the blade dressing device in the control circuit if the counted number of wafers sliced since the last blade dressing is fewer than a predetermined lower limit stored in the control circuit.

2. A method as set forth in claim 1 wherein the step of detecting the blade location factor comprises the step of detecting the position of the blade within the ingot in directions perpendicular to the plane of the blade.

3. A method as set forth in claim 2 wherein the step of determining the deviation of the detected blade location factor from the zero blade deviation factor includes the step of determining the magnitude and direction of deflection of the detected blade position from a zero blade deflection position, wherein the step of comparing the detected blade deviation factor to the maximum blade deviation limit comprises the step of comparing the blade deflection to a maximum blade deflection limit, and wherein the step of activating the blade dressing device includes the step of controlling the blade dressing device according to the determined direction of blade deflection to sharpen the blade so as to correct the blade deflection.

4. A method as set forth in claim 3 wherein the annular blade has an inner face, an outer face and a cutting edge, and wherein the step of controlling the blade dressing device includes the step of directing the blade dressing device to sharpen the cutting edge of the blade on the face which is opposite to the determined direction of the deflection of the blade.

5. A method as set forth in claim 2 wherein the step of determining the deviation of the detected blade location factor from the zero blade deviation factor includes the step of determining the magnitude and direction of deflection of the detected blade position from a zero blade deflection position, and wherein the step of activating the blade dressing device includes the step of controlling the blade dressing device according to the determined direction of blade deflection to sharpen the blade so as to correct the blade deflection in the determined direction.

6. A method as set forth in claim 5 wherein the annular blade has an inner face, an outer face and a cutting edge, and wherein the step of controlling the blade dressing device includes the step of directing the blade dressing device to sharpen the cutting edge of the blade on the face which is opposite to the determined direction of the deflection of the blade.

7. A method as set forth in claim 1 wherein the step of detecting the blade location factor comprises the step of detecting the force applied to one of an inside face and an outside face of the blade to urge the blade to maintain the zero blade deflection position, and wherein the step of determining the deviation of the blade location factor from the zero blade deviation factor comprises the step of determining the deviation of the detected force applied to the blade from a zero blade deflection force selected to urge the blade to maintain the zero blade deflection position, and wherein the step of comparing in the control circuit the determined blade deviation to a maximum blade deviation limit comprises the step of comparing the determined force deviation to a maximum force deviation limit stored in the control circuit.

8. A method as set forth in claim 7 wherein the step of determining the deviation of the detected force from the zero blade deflection force comprises the step of determining the magnitude of the deviation and whether the detected force is greater or less than the zero blade deflection force, and wherein the step of activating the blade dressing device includes the step of controlling the blade dressing device according to whether the detected force is greater or less than the zero blade deflection force so as to return the detected force approximately to the zero blade deflection force for the next wafer sliced.

9. A method as set forth in claim 8 wherein the annular blade has a cutting edge, and wherein the step of controlling the blade dressing device includes the step of directing the blade dressing device to sharpen the cutting edge of the blade on the face which is opposite to said one face to which the force is applied when the detected force is less than the zero blade deflection force and directing the blade dressing device to sharpen the cutting edge of the blade on the same face to which the force is applied when the detected force is greater than the zero blade deflection force.

10. A method for slicing wafers from an ingot of wafer source material using an internal diameter saw having an annular blade in which process parameters having a direct relationship to wafer quality are measured and automatic adjustments are made in response to measured process parameters, the method comprising the steps of:

slicing a wafer from the ingot with the internal diameter saw;

applying a force to one of an inner face and an outer face of the blade to urge the blade toward a zero blade deflection position;

detecting the position of the blade at least one location during the step of slicing;

detecting the force applied to said one face of the blade at least one location during the step of slicing;

generating signals corresponding to the detected blade position and detected force;

transmitting the detected blade position and detected force signals to a control circuit;

determining in the control circuit the deflection of the detected blade position from the zero deflection blade position stored in the control circuit;

comparing in the control circuit the determined blade deflection to a maximum blade deflection limit stored in the control circuit;

determining in the control circuit the deviation of the detected force applied to the blade from a zero blade deflection force selected to maintain the blade in the zero blade deflection position;

comparing in the control circuit the force deviation to a maximum force deviation limit stored in the control circuit; and activating by operation of the control circuit a blade dressing device to sharpen the blade if the determined blade deflection exceeds the stored maximum blade deflection limit or if the determined force deviation exceeds the maximum force deviation limit;

counting within the control circuit the number of wafers sliced during which the determined blade deflection or determined force deviation exceeded the maximum blade deflection limit or maximum force deviation limit since the last blade dressing; and prohibiting activation of the blade dressing device in the control circuit if the counted number of wafers sliced since the last blade dressing is fewer than a predetermined lower limit stored in the control circuit.

11. A method as set forth in claim 10 wherein the step of detecting blade position comprises the steps of detecting the blade position at a location within the ingot, and detecting blade position at a location adjacent to the ingot.

12. A method as set forth in claim 11 wherein the step of determining the deflection of the detected blade position from the zero blade deflection position includes the step of determining the magnitude and direction of deflection of the detected blade position from the zero blade deflection position, and wherein the step of activating the blade dressing device includes the step of controlling the blade dressing device according to the determined direction of blade deflection to sharpen the blade so as to correct the blade deflection in the determined direction.

13. A method as set forth in claim 12 wherein the step of controlling the blade dressing device includes the step of directing the blade dressing device to sharpen a cutting edge of the blade on the face which is opposite to the determined direction of the deflection of the blade.

14. A method as set forth in claim 10 wherein the step of determining the deviation of the detected force from the zero blade deflection force comprises the step of determining the magnitude of the deviation and whether the detected force is greater or less than the zero blade deflection force, and wherein the step of activating the blade dressing device includes the step of controlling the blade dressing device according to whether the detected force is greater or less than the zero blade deflection force.

15. A method as set forth in claim 14 wherein the annular blade has a cutting edge, and wherein the step of controlling the blade dressing device includes the step of directing the blade dressing device to sharpen the cutting edge of the blade on the face which is opposite to said one face to which the force is applied when the force deviation is less than the zero blade deflection force and directing the blade dressing device to sharpen the cutting edge of the blade on the same face to which the force is applied when the detected force is greater than the zero blade deflection force so as to return the detected force approximately to the zero blade deflection force for the next wafer sliced.

16. Apparatus for slicing wafers from an ingot of wafer source material comprising:

an internal diameter saw including an annular blade having an inner face, an outer face and a cutting edge on its internal diameter, a frame mounting the annular blade for rotation relative thereto and capable of supporting the ingot for slicing;

sensor means located for detecting a blade location factor as the saw is slicing a wafer from the ingot, the blade location factor being selected from at least one of the position of the blade within the ingot and the force applied to the blade for urging the blade to maintain a zero blade deflection position, and transmitting a signal corresponding to the detected blade location factor;

an automatic dressing device mounted for sharpening the cutting edge of the annular blade;

a controller for controlling the automatic dressing machine, the controller being programmed for receiving the signal from the sensor corresponding to the detected blade location factor, determining the deviation of the blade location factor from a zero blade deviation factor stored in the controller, comparing the determined blade deviation to a maximum blade deviation limit stored in the controller, and activating the blade dressing device to sharpen the blade if the determined blade deviation exceeds the stored maximum blade deviation limit;

the controller including means for counting the number of wafers sliced during which the determined blade deflection or determined force deviation exceeded the maximum blade deflection limit or maximum force deviation limit since the last blade dressing, and means for prohibiting activation of the blade dressing device if the counted number of wafers sliced since the last blade dressing is fewer than a predetermined lower limit stored in the controller.

17. Apparatus as set forth in claim 16 wherein the controller is programmed to determine both the magnitude and the direction of the blade location factor from the zero blade deviation location factor, the controller being capable of controlling the dressing device to sharpen the cutting edge on one of the inner and outer faces of the blade according to the determined direction of the blade location factor from the zero blade deviation factor.

18. Apparatus as set forth in claim 16 wherein said sensor means comprises:

a blade position sensor located for detecting the position of the blade within the ingot in directions perpendicular to the plane of the blade;

a force sensor for detecting the force applied to the blade for urging the blade to maintain a zero blade deflection position.

* * * * *